United States Patent
Hohner et al.

(10) Patent No.: US 6,213,092 B1
(45) Date of Patent: Apr. 10, 2001

(54) METHOD FOR DETERMINING THE RUNNING SMOOTHNESS OF AN OTTO SPARK IGNITION ENGINE

(75) Inventors: Peter Hohner, Leinfelden-Echterdingen; Jürgen Schenk, Albershausen; Hartung Wilstermann, Gaildorft, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/292,300

(22) Filed: Apr. 15, 1999

(30) Foreign Application Priority Data

Apr. 15, 1998 (DE) ............................................... 198 16 641

(51) Int. Cl.$^7$ ................................................... F02P 5/152
(52) U.S. Cl. ..................................... 123/406.38; 73/35.08
(58) Field of Search ........................ 123/406.21, 406.26, 123/406.3, 406.37–406.39; 701/104; 73/117.3, 35.08

(56) References Cited

U.S. PATENT DOCUMENTS

| | | |
|---|---|---|
| 4,535,406 | 8/1985 | Johnson . |
| 5,785,020 * | 7/1998 | Takahashi et al. ................... 123/425 |
| 5,895,839 * | 4/1999 | Takahashi et al. ................... 73/35.08 |
| 6,073,611 * | 6/2000 | Ohuchi et al. ....................... 123/435 |

FOREIGN PATENT DOCUMENTS

| | | |
|---|---|---|
| 43 24 312 | 2/1994 | (DE) . |
| 40 15 191 | 2/1995 | (DE) . |
| 44 02 938 | 8/1995 | (DE) . |
| 195 245 40 | 6/1996 | (DE) . |
| 195 24 539 | 11/1996 | (DE) . |
| 195 24 541 | 12/1996 | (DE) . |

* cited by examiner

Primary Examiner—Tony M. Argenbright
Assistant Examiner—Arnold Castro
(74) Attorney, Agent, or Firm—Kenyon & Kenyon

(57) ABSTRACT

The present invention relates to a method for determining the running smoothness of an Otto spark ignition engine by measuring the ionic current (I) in at least one combustion chamber of the Otto spark ignition engine. Once the spark plug has fired, a measuring voltage is applied to the spark plug, inducing the ionic current (I). Following each ionic current measurement, initially an active, average ionic-current value ($I_M$) is defined, and a running-smoothness value (L) is subsequently determined from a reference value and the ionic-current average value ($I_M$).

12 Claims, 2 Drawing Sheets

METHOD FOR DETERMINING THE RUNNING SMOOTHNESS OF AN OTTO SPARK IGNITION ENGINE

FIELD OF THE INVENTION

The present invention relates to a method for determining the running smoothness of an Otto spark ignition engine by measuring the ionic current in at least one combustion chamber of the Otto spark ignition engine.

RELATED TECHNOLOGY

German Patent Nos. 40 15 191 C2, 195 24 539 C1, 195 24 540 C1 and 195 24 541 C1 disclose devices used for measuring the ionic current in the combustion chamber of an Otto spark ignition engine. In the process, the spark plug is used generally as a measuring sensor, a measuring voltage being applied to the electrodes of the spark plug following each firing. This accelerates the ions and electrons present in the electric field of the spark plug's electrodes due to the combustion in the combustion chamber, thereby inducing the ionic current. Reference is also made to the fact that the ionic current can be used to control running smoothness on a cylinder-selective basis. However, no specific embodiments are disclosed for implementing the running smoothness control.

SUMMARY OF THE INVENTION

An object of the present invention is to develop a method for determining the running smoothness of an Otto spark ignition engine which will ensure a reliable determination of running smoothness.

The present invention provides a method for determining the running smoothness of an Otto spark ignition engine by measuring the ionic current (I) in at least one combustion chamber of the Otto spark ignition engine once the spark plug allocated to the combustion chamber has fired, a measuring voltage being applied to the spark plug for measuring ionic current. Following each ionic current measurement, initially an active, average ionic-current value is defined, a running-smoothness value being subsequently determined from a reference value and the ionic-current average value.

By generating the average ionic-current value from a plurality of ionic-current measurements, a high level of accuracy can be achieved for the running-smoothness value. By including the reference value in the running-smoothness value, one attains a weighting of the ionic-current average value, which enters into the running-smoothness value.

Advantageous further embodiments of the method according to the present invention may include that: (a) the reference value is formed from an average deviation value $(A_M)$, the deviation being derived from the amount of the difference between the most recently measured ionic current (I) and the active ionic-current average value $(I_M)$; (b) the running-smoothness value (L) is determined from the integrated reference value and an integrated ionic-current weighting quantity (IB), which is a function of the average ionic-current value $(I_M)$ and/or the measured ionic current (I); (c) the quotient obtained by dividing the integrated reference value by the integrated ionic weighting quantity (IB) indicates the running-smoothness value (L); (d) the ionic-current weighting quantity (IB) is formed from the integrated, average ionic-current value $(I_M)$; (e) the ionic-current weighting quantity (IB) is formed from the differential value attained by subtracting the last measured ionic current $(I_n)$ from the average ionic-current value $(I_M)$; (f) the average ionic-current value $(I_M)$ and/or the average deviation value $(A_n)$ is formed with the aid of a shift register device (16); (g) a plurality of measured ionic currents (I) are stored in a first shift register (17) of the shift-register device (16), and a plurality of deviation values (A) are stored in a second shift register (18) of the shift-register device (16); (h) the active, average ionic-current value $(I_M)$ and/or the active, average deviation value $(A_M)$ are determined directly from the average value that precedes it in each instance and from the last measured ionic current $(I_n)$, i.e., the active deviation $(A_n)$; (i) the running-smoothness value (L) is used for controlling in open/or closed loop at least one valve-timing device, such as the exhaust-gas recirculation valve, injection system, or ignition system; (j) the running-smoothness value (L) is defined in a computational unit (12); and/or (k) ionic current (I) measured at the spark plug is an analog current signal, which is initially converted into a digital current signal, and subsequently routed to computational unit (12).

The reference value is expediently formed from an average deviation value, the deviation being derived from the amount of the difference between the most recently, i.e. last, measured ionic current and the active ionic-current average value. In this case, the difference between the ionic current and the average ionic-current value enters into the running-smoothness value, with the result that the last ionic current measurement is weighted with respect to the previously determined, average ionic-current value.

The running-smoothness value is advantageously determined from the integrated reference value and an integrated ionic-current weighting quantity, which is a function of the average ionic-current value and/or the measured ionic current. By generating the integral of the reference value, i.e., the ionic-current weighting quantity, one obtains in each case a scalar value, from which the running-smoothness value can then be determined.

In this case, the quotient obtained by dividing the integrated reference value by the integrated ionic weighting quantity can indicate the running-smoothness value, so that the integrated reference value is scaled to the integrated ionic weighting quantity.

An especially simple method for generating the average ionic-current value and/or the average deviation value is to determine these values with the aid of a shift register device, a plurality of measured ionic current values being storable in particular in a first shift register, and a plurality of deviation values being storable in a second shift register. In the process, the average values are calculated from the sum of the individual shift register entries, divided by the number of shift-register memory locations.

Alternatively, it is also possible to determine the active, average ionic-current value and/or the active average deviation value directly from the average value that precedes it in each instance and from the last measured ionic current, i.e., the active deviation. It suffices in this case to store merely the active, average ionic-current value or the average deviation value, so that only little memory capacity is needed.

In another expedient embodiment, the running-smoothness value is used for controlling in open/or closed loop at least one valve-timing device, such as the exhaust-gas recirculation valve, injection system, or ignition system, making it possible to optimize the emissions from the Otto spark ignition engine or its running smoothness.

In one beneficial circuit arrangement for implementing the method, the running-smoothness value is defined in a computational unit.

BRIEF DESCRIPTION OF THE DRAWINGS

In the following, the method according to the present invention is elucidated on the basis of the enclosed drawings, in which.

DETAILED DESCRIPTION

Figure 1:
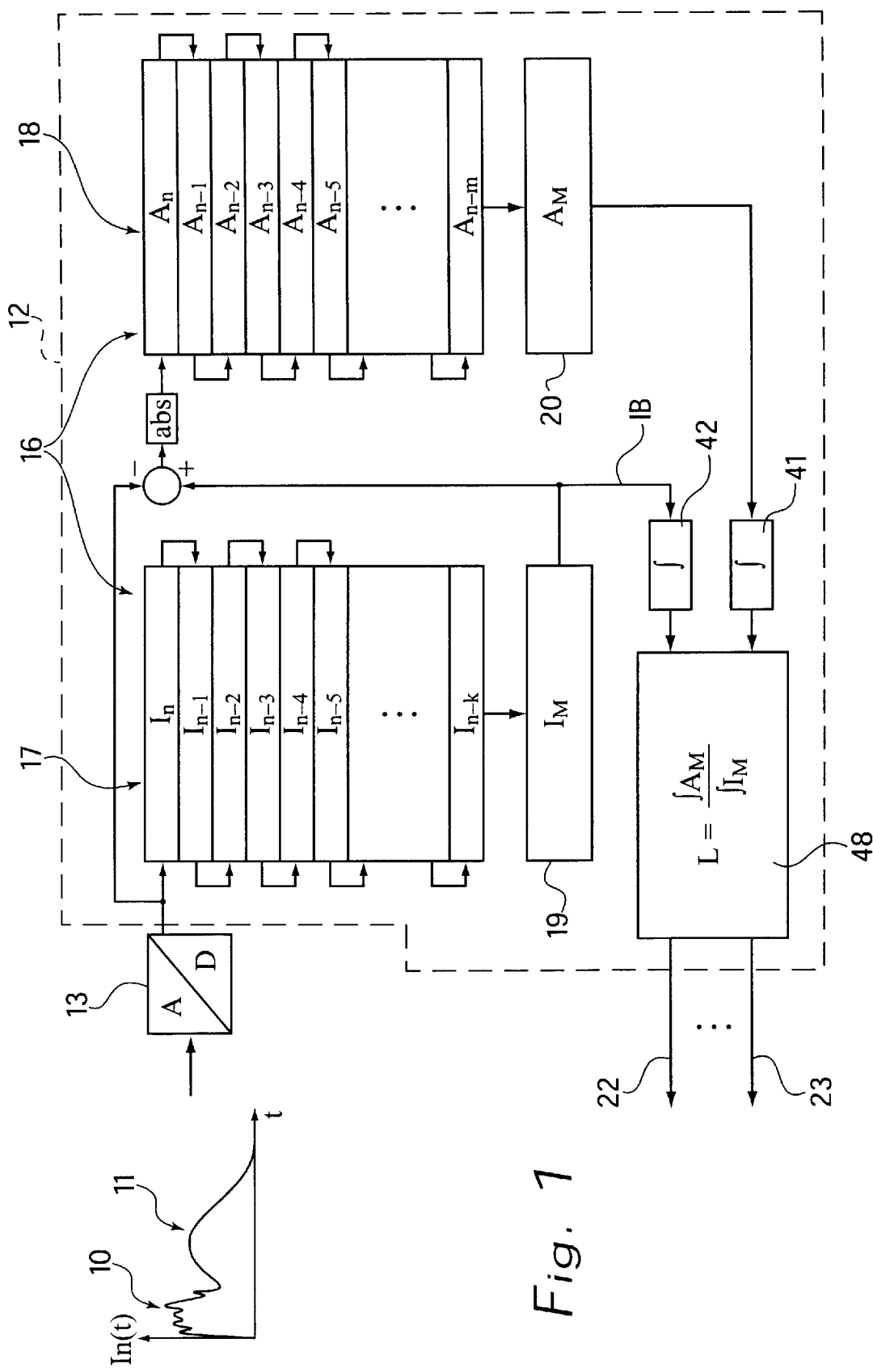
FIG. 1 shows a block diagram for implementing a first version of the method according to the present invention, including a shift register device.
Figure 2:
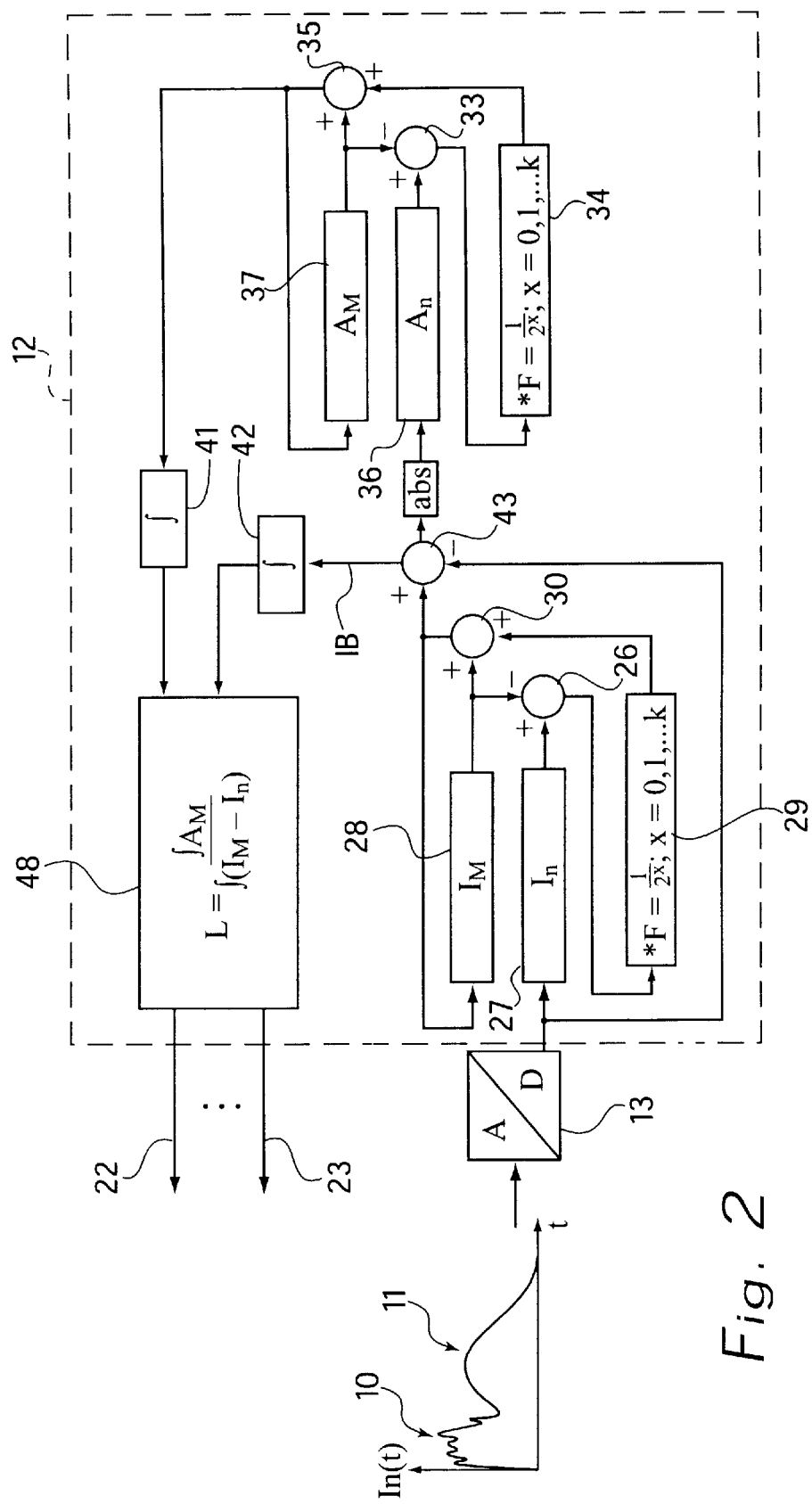
FIG. 2 shows a block diagram for implementing a second version of the method, including direct averaging from the preceding average value in each instance.

FIGS. 1 and 2 each show a block diagram for implementing a method for determining the running smoothness of an Otto spark ignition engine by measuring ionic current I. Ionic current I is measured in at least one combustion chamber of the Otto spark ignition engine subsequent to firing of the spark plug assigned to the combustion chamber. When the air-fuel mixture is burned in the combustion chamber, ions and electrons are released. To measure the ionic current, a measuring voltage is applied to the spark plug, the measuring voltage usually being selected so that no further ignition spark is formed at the spark plug. Forming as a result between the electrodes of the spark plug is an electric field, in which the ions and electrons are accelerated, inducing ionic current I. This ionic current I can be measured at the spark plug.

Once the spark plug has fired, the ionic current shows a characteristic variation over time, with a first maximum 10 and a second maximum 11. Maximum 10, which occurs first in time, of ionic current I is generated by the high level of ionization in the flame core, the formation of the flame core being directly correlated with the cyclical fluctuations of the pressure characteristic in the combustion chamber, and thus with the running smoothness of the Otto spark ignition engine. In response to unfavorable mixture ratios in the combustion chamber, for example a too rich or too lean mixture, or in response to an excess of residual gas components, the flame core formation lags, and first maximum 10 of ionic current I is delayed in time with respect to an optimal point in time. Accordingly, first maximum 10 is generated too late. In addition, unfavorable mixture ratios result in a smaller ionic current value in the range of first maximum 10, so that ionic current I within the range of its first maximum 10 is too low. Therefore, a determination can be made about the running smoothness of the Otto spark ignition engine on the basis of the temporal position and the magnitude of first maximum 10 of ionic current I.

The temporal position of second maximum 11 of ionic current I can be used as an index for the point in time when the maximum pressure prevails in the combustion chamber, so that second maximum 11 of ionic current I also permits a determination to be made about the running smoothness of the Otto spark ignition engine.

To be able to optimize the emissions from the Otto spark ignition engine, an exhaust-gas recirculation (EGR) often is performed, the exhaust gas component recirculated into the combustion chamber, the so-called inert gas component, being controlled by an exhaust-gas recirculation valve. This inert gas component must be optimized to achieve the lowest possible emissions, for example, of nitrogen oxides and of unburned hydrocarbons. By lowering emissions, one can simultaneously lower fuel consumption.

By optimizing running smoothness, one optimizes emissions and consumption at the same time, so that the present method enables a control to be performed in open or closed loop of one or a plurality of valve-timing devices, such as of an exhaust-gas recirculation valve, an injection system or ignition system. For this, one determines the running-smoothness value L, which can be fed to the various valve-timing devices.

The same reference symbols are used in the variants clarified in the following for the same method steps.

Running smoothness value L is determined, on the basis of an example, in a computational unit 12. Ionic current I measured at the spark plug (not shown in greater detail) is present as an analog current signal, which is initially converted in an analog-digital converter 13 into a digital current signal, before being routed to computational unit 12 for further processing.

Following each ionic current measurement in computational unit 12, an active, average ionic-current value $I_M$ is defined, it being possible, as a general principle, to select any desired averaging method. The last ionic current I to be measured is characterized by index n. For earlier measurements, the index becomes smaller (n−1, n−2, . . . ).

In the first version of the method in accordance with FIG. 1, computational unit 12 has a shift-register device 16, whose first shift register 17 is used for storing the measured values of ionic current I. First shift register 17 contains k memory locations, in which one ionic current value I can be stored at a time. It is, therefore, the last k ionic current values I that are stored, the individual ionic current values I being shifted by one memory location in response to the acceptance of a new ionic current value $I_n$ in first shift register 17. In the process, ionic current value $I_{n-k}$ stored at the last memory location is pushed out of first shift register 17, so that first shift register 17 is a FIFO memory.

Average ionic-current value $I_M$ is calculated in averaging stage 19 from the sum of ionic current values $I_n$, $I_{n-1}$, . . . , $I_{n-k}$ stored in first shift register 17, divided by the number of stored current characteristics k.

In contrast, in the second method according to FIG. 2, average ionic-current value $I_M$ is determined in that in a differential stage 26, the difference is first determined by subtracting from the last measured ionic current value $I_n$, which for example is buffer-stored, i.e. stored temporarily, in an input memory 27, the previous, average ionic-current value $I_M$ stored in a memory 28 of computational unit 12. This difference is weighted within a subsequent waiting stage 29 by a factor F, equal, for example, to $1/2^x$, x being able to assume values 0, 1, . . . , k. The weighted difference is subsequently added in a summing stage of 30 to previous average ionic-current value $I_M$, yielding new average ionic-current value $I_M$, which is then stored in memory 28 of computational unit 12. Thus, the active, average ionic-current value $I_M$ is determined directly from the previous average value and the last measured ionic-current value $I_n$.

In both versions of the method according to the present invention, the running-smoothness value is derived from the active, average ionic-current value and a reference value, used for weighting average ionic-current value $I_M$.

In both versions of the method elucidated here, the reference value is produced from an average deviation value $A_M$. Deviation A is derived in this context from the amount of the difference between the last measured ionic-current value $I_n$ and the active, average ionic-current value $I_M$. It is an index for the fluctuation in the ionic-current value I with respect to its average value $I_M$.

In the first version of the method, as shown in FIG. 1, average deviation value $A_M$ is determined with the aid of second shift register 18 of shift-register device 16, second shift register m having memory locations for deviations A. Average deviation value $A_M$ is determined analogously to average ionic-current value $I_M$ using an averaging stage 20 assigned to the second shift register. As a general principle, one can select any desired memory depth for the two shift registers 17, 18, a greater number of memory locations enhancing the accuracy of the average value $I_M$, $A_M$ in question.

In accordance with a block diagram of FIG. 2, the active, average deviation value $A_M$ in this second variant of the method is determined directly from the preceding average deviation value $A_M$ stored in computational unit 12 and from active deviation $A_n$. The calculation is performed analogously to the determination of average ionic-current value $I_M$ in this specific embodiment of the method, using steps 33, 34, 35, which correspond to steps 26, 29, 30, and memory devices 36, 37, which correspond to memory devices 27, 28.

Generally, the average values of ionic current I and deviation A in this second embodiment of the method are generated, so to speak, by a low-pass filtering. In this case, factor F specifies the level of the smoothing, for x=0, factor F=1, signifying a low level of smoothing. For ascending values of x, factor F decreases and, thus, the smoothing becomes more intense. It is also possible, in a variation of this specific embodiment, to use any other desired smoothing method to obtain average values $I_M$, $A_M$.

Common to both exemplary variants of the method of the present invention is that running-smoothness value L is determined from the reference value integrated in an integration stage 41, formed, in accordance with the example, from average deviation value $A_M$, and from an ionic-current weighting quantity IB integrated in an integration stage 42. In the form according to FIG. 1, ionic-current weighting quantity IB corresponds to average ionic-current value $I_M$. In contrast, in the second variant of the embodiment according to the method of the present invention, in accordance with FIG. 2, ionic-current weighting quantity IB is calculated using a differential stage 43 from the difference formed by subtracting the last measured ionic current $I_n$ from average ionic-current value $I_M$. Ionic-current weighting quantity IB can assume both positive as well as negative values, its absolute value being equal to the last determined deviation $A_n$.

In both cases, running-smoothness value L is determined as a function of the integrated average deviation value $A_M$ and of the integrated ionic-current weighting quantity IB determined in computational unit 12. This is done, in accordance with the example, by forming the quotient within a division stage 48 from the integrated reference value, thus, by dividing the integrated average deviation value $A_M$ by the integrated ionic-current weighting quantity IB.

Running-smoothness value L is output at one or a plurality of outputs 22, 23 of computational unit 12 and, for example, fed to at least one valve-timing device. As already mentioned, this enables, for example, the exhaust-gas recirculation valve to be controlled in closed loop, in particular in Otto spark ignition engines having stoichiometric air-fuel ratios. A particular advantage of the closed-loop control of valve-timing devices using the present method is evident in that there is no need for any structural modifications at the cylinder head where the ionic current is measured, since the spark plug that is already present is used as a sensor for measuring ionic current I.

A further application of the method according to the present invention, enables one to determine the misfire limit when working with lean-mix engines.

The individual steps of the method are implemented in both variants by functions within computational unit 12 and, in accordance with the example, do not represent separate modules.

What is claimed is:

1. A method for determining running smoothness of an Otto spark ignition engine having at least a first combustion chamber and a first spark plug associated with the first combustion chamber, the method comprising the steps of:

measuring an ionic current in the first combustion chamber once the first spark plug has fired by applying a measuring voltage to the first spark plug;

defining an active ionic-current average value following each measuring of the ionic current; and determining a running-smoothness value as a function of a reference value and the ionic-current average value.

2. The method as recited in claim 1 wherein the reference value is determined as a function of an average deviation value of a deviation, the deviation being derived from a difference between a last measured ionic current and the active ionic-current average value.

3. The method as recited in claim 1 wherein the running-smoothness value is determined as a function of an integral of the reference value and an integrated ionic-current weighting quantity, the integrated ionic-current weighting quantity being a function of at least one of the ionic-current average value and the measured ionic current.

4. The method as recited in claim 3 wherein the running smoothness value is a quotient obtained by dividing the integral of the reference value by the integrated ionic-current weighting quantity.

5. The method as recited in claim 3 wherein the integrated ionic-current weighting quantity is determined as a function of an integral of the ionic-current average value.

6. The method as recited in claim 3 wherein the ionic-current weighting quantity is determined as a function of a differential value attained by subtracting a last measured ionic current from the ionic-current average value.

7. The method as recited in claim 2 wherein at least one of the ionic-current average value and an average deviation value is formed with the aid of a shift register device.

8. The method as recited in claim 7 wherein a plurality of measured ionic currents are stored in a first shift register of the shift-register device, and a plurality of deviation values are stored in a second shift register of the shift-register device.

9. The method as recited in claim 2 wherein at least one of the active ionic-current average value aid an active, average deviation value are determined directly from a preceding average value and as a function of the last measured ionic current.

10. The method as recited in claim 1 further comprising controlling at least one valve timing device of the engine in an open or closed loop as a function of the running-smoothness value.

11. The method as recited in claim 1 wherein the running-smoothness value is determined in a computational unit.

12. The method as recited in claim 11 wherein the measured ionic current at the spark plug is an analog current signal, and further comprising converting the analog current signal into a digital current signal and routing the digital current signal to the computational unit.

* * * * *

UNITED STATES PATENT AND TRADEMARK OFFICE
CERTIFICATE OF CORRECTION

PATENT NO. : 6,213,092 B1  
DATED : April 10, 2001  
INVENTOR(S) : Hohner et al.

It is certified that error appears in the above-identified patent and that said Letters Patent is hereby corrected as shown below:

Column 6,
Line 2, after "value" change "aid" to -- and --.

Signed and Sealed this

Eleventh Day of June, 2002

Attest:

Attesting Officer

JAMES E. ROGAN
Director of the United States Patent and Trademark Office